United States Patent
Baik (10) Patent No.: US 11,391,413 B2
(45) Date of Patent: Jul. 19, 2022

(54) STEAM TRAP

(71) Applicant: TSK CO., LTD., Seongnam-si (KR)

(72) Inventor: Chang Ki Baik, Seoul (KR)

(73) Assignee: TSK CO., LTD., Seongnam-si (KR)

( * ) Notice: Subject to any disclaimer, the term of this patent is extended or adjusted under 35 U.S.C. 154(b) by 0 days.

(21) Appl. No.: 17/433,841

(22) PCT Filed: Nov. 7, 2019

(86) PCT No.: PCT/KR2019/005193
§ 371 (c)(1),
(2) Date: Aug. 25, 2021

(87) PCT Pub. No.: WO2019/212226
PCT Pub. Date: Nov. 7, 2019

(65) Prior Publication Data
US 2022/0146044 A1    May 12, 2022

(30) Foreign Application Priority Data

Apr. 30, 2018  (KR) .................. 10-2018-0050127
Apr. 30, 2018  (KR) .................. 10-2018-0050128

(51) Int. Cl.
*F16K 3/02*    (2006.01)
*F16T 1/42*    (2006.01)
(Continued)

(52) U.S. Cl.
CPC ............... *F16T 1/42* (2013.01); *F16K 3/06* (2013.01); *F16K 3/314* (2013.01); *F16K 11/074* (2013.01);
(Continued)

(58) Field of Classification Search
CPC ....... F16T 1/42; F16T 1/02; F16T 1/38; F16K 3/06; F16K 11/074; F16K 31/00; F16K 3/02
See application file for complete search history.

(56) References Cited

U.S. PATENT DOCUMENTS 3,145,969 A * 8/1964 Von Zweck ............ F16K 51/02
                                                       251/328
3,575,207 A * 4/1971 Denner ................ G05D 23/126
                                                       62/223
(Continued)

FOREIGN PATENT DOCUMENTS

JP    2006052749 A    2/2006
JP    2006170320 A    6/2006
(Continued)

*Primary Examiner* — Matthew W Jellett
*Assistant Examiner* — Christopher D Ballman
(74) *Attorney, Agent, or Firm* — Maschoff Brennan (57) ABSTRACT

A steam trap comprises: a main body having a flow path between an inlet and an outlet; an opening and closing unit, installed at an outlet of the main body, and an operation unit, installed in the flow path between the inlet and the outlet, wherein the opening and closing unit is provided with a nozzle that has a discharge hole, and includes an opening and closing member which is in close contact with the nozzle at the inlet side of the flow path for blocking or opening the discharge hole while linearly moving, and an operating rod for connecting the operating unit and the opening and closing member to linearly move the opening and closing member to the operating unit.

4 Claims, 10 Drawing Sheets

(51) Int. Cl.
*F16K 11/074* (2006.01)
*F16T 1/02* (2006.01)
*F16K 3/314* (2006.01)
*F16K 31/00* (2006.01)
*F16K 3/06* (2006.01)
*F16T 1/38* (2006.01)

(52) U.S. Cl.
CPC ............... *F16K 31/00* (2013.01); *F16T 1/02* (2013.01); *F16T 1/38* (2013.01)

(56) References Cited

U.S. PATENT DOCUMENTS

| | | | | |
|---|---|---|---|---|
| 3,656,592 A * | 4/1972 | Keller | ............... | F15B 13/16 188/270 |
| 4,623,091 A * | 11/1986 | Stein | ............... | F16T 1/20 236/55 |
| 4,643,226 A * | 2/1987 | Balz | ............... | F16K 3/0209 137/625.33 |
| 4,706,699 A * | 11/1987 | Foller | ............... | F16T 1/38 137/614.21 |
| 5,803,431 A * | 9/1998 | Hoang | ............... | E21B 29/08 251/327 |
| 6,056,266 A * | 5/2000 | Blecha | ............... | F16K 31/122 251/193 |
| 6,629,682 B2 * | 10/2003 | Duelli | ............... | F16K 3/18 251/328 |
| 6,854,708 B2 * | 2/2005 | Contin | ............... | F16K 3/18 251/327 |
| 6,863,256 B2 * | 3/2005 | Lucas | ............... | F16K 51/02 251/193 |
| 7,048,004 B2 * | 5/2006 | Biester | ............... | F03G 7/005 137/625.68 |
| 7,654,505 B2 * | 2/2010 | Schoen | ............... | F16K 3/188 251/193 |
| 8,733,734 B2 * | 5/2014 | Nakamura | ............... | F16K 3/188 251/328 |
| 9,366,343 B2 * | 6/2016 | Roman | ............... | F16K 3/32 |
| 9,664,293 B2 * | 5/2017 | Zanetti | ............... | F16K 27/047 |
| 10,422,197 B2 * | 9/2019 | Herland | ............... | F16K 3/02 |
| 10,612,673 B2 * | 4/2020 | Wada | ............... | F16K 51/02 |
| 2005/0067603 A1 * | 3/2005 | Lucas | ............... | F16K 3/06 251/326 |
| 2009/0057597 A1 * | 3/2009 | Ji | ............... | F16K 51/02 251/118 |
| 2014/0217320 A1 * | 8/2014 | DeOcampo | ............... | F16K 3/0254 137/553 |
| 2015/0118083 A1 | 4/2015 | Bagagli et al. | | |
| 2015/0267820 A1 * | 9/2015 | Kiesbauer | ............... | F16K 31/12 251/304 |
| 2017/0130577 A1 * | 5/2017 | Cheng | ............... | F16K 37/0033 |
| 2018/0356036 A1 | 12/2018 | Baik | | |
| 2020/0132222 A1 * | 4/2020 | Eschenmoser | ............... | F16K 3/0218 |

FOREIGN PATENT DOCUMENTS

| | | |
|---|---|---|
| KR | 20150006041 A | 1/2015 |
| KR | 101704296 B1 | 2/2017 |
| KR | 20170064222 A | 6/2017 |

\* cited by examiner

STEAM TRAP

TECHNICAL FIELD

The present disclosure relates to a steam trap, and more particularly to a steam trap for preventing steam from leaking while effectively discharging condensate generated by condensing steam.

BACKGROUND ART

When high-temperature and high-pressure superheated steam from a power plant flows into a pipe, some heat is lost due to heat dissipation, and as a result, some steam is condensed.

The condensed water generated at this time causes water hammer and damages a valve disk while moving along a steam main and adversely affects thermal efficiency at the final place where the water is used, and accordingly, steam traps are installed at regular intervals between the steam mains.

The steam trap is a device for automatically discharging only liquid when vapor in a drum or a pipe is condensed into liquid. In other words, the steam trap is an automatic valve designed to remove condensate and prevent steam from leaking out.

Therefore, a steam trap system needs to be capable of removing air and non-condensable gases, and needs to be operated to ensure overall system performance and to achieve energy saving.

When steam leaks from a steam trap, heat of the steam is released, resulting in loss of energy and increasing pressure in a recovery pipe of condensate, and thus pressure of other steam traps connected to the recovery pipe of condensate is affected, reducing overall system efficiency.

In addition, when condensate is not discharged properly, there is a problem in that water hammer occurs, which leads to shortening of the lifespan of a valve and a main pipe.

A bellows-type steam trap includes an inlet port and an outlet port for introduction and exit of condensate and steam, and is formed so that a passage through which condensate and steam pass and an operating direction of a bellows are perpendicular to each other.

This outlet port includes a plug and a nozzle, and a pressure equal to or greater than differential pressure acting on the area of the nozzle is required to operate the outlet port.

DISCLOSURE

Technical Problem

Therefore, the present disclosure has been made in view of the above problems, and it is one object of the present disclosure to provide a steam trap for increasing the discharge of condensate using a wide nozzle with the same operating force by arranging the nozzle vertically and opening and closing the nozzle in a sliding manner.

Technical Solution

In accordance with one aspect of the present disclosure, provided is a steam trap including a body including an inlet and an outlet, and formed with a flow path between the inlet and the outlet, an opening/closing unit installed in the outlet of the body and configured to open and close the flow path, and an operating unit installed on the flow path and configured to operate the opening/closing unit, wherein the opening/closing unit is formed with at least one discharge hole and includes a nozzle configured to close a side of the outlet of the flow path, a through hole connected to the discharge hole when the opening/closing unit performs an opening operation, an opening/closing unit configured to close or open the discharge hole while moving in a straight line in close contact with the nozzle, and an operation rod connecting the operation unit and the opening/closing unit and configured to move the opening/closing unit in a straight line.

The steam trap may further include a slide guide disposed between the nozzle and the opening/closing unit and configured to allow the opening/closing unit in close contact with the nozzle to smoothly move in a straight line.

The opening/closing unit may further include a pressing unit configured to press the opening/closing unit toward the nozzle to minimize a gap formed between the nozzle and the opening/closing unit.

The pressing unit may include a support member spaced apart from the opening/closing member toward the inlet and disposed across the flow path, a pressing member disposed between the support member and the opening/closing unit to press the opening/closing unit toward the nozzle, and a guide portion configured to guide the pressing member to slide on the support member or the opening/closing unit.

In accordance with another aspect of the present disclosure, provided is a steam trap including a body including an inlet and an outlet, and formed with a flow path between the inlet and the outlet, an opening/closing unit installed in the outlet of the body and configured to open and close the flow path, and an operating unit installed on the flow path and configured to operate the opening/closing unit, wherein the opening/closing unit is formed with a discharge hole and includes a nozzle configured to close a side of the outlet of the flow path, a through hole connected to the discharge hole when the opening/closing unit performs an opening operation, an opening/closing unit configured to close or open the discharge hole while rotating in close contact with the nozzle, an operating rod connecting the operating unit to the opening/closing unit and configured to rotate the opening/closing unit through the operating unit, and a connection link having one end that is rotatably connected to the operating rod and a remaining end coupled to the opening/closing unit and configured to convert linear motion of the operating rod into rotary motion of the opening/closing unit.

When the discharge hole of the nozzle and the through hole of the opening/closing unit are configured in plural, the holes are arranged spaced apart from each other by a preset angle in a circumferential direction.

A distance to a center of the nozzle from a center of the discharge hole may be the same as a distance to a rotation center of the opening/closing unit from a center of the through hole connected to the discharge hole.

The operating rod and the connection link may be hinged to each other through a hinge pin, a long hole, into which the hinge pin is inserted, may be formed in an end of the connection link, and the hinge pin may be configured to reciprocate in the long hole during an operation of the operating unit.

The operating unit may include bellows configured to be expanded by being heated by condensate, steam, and gas introduced into the flow path through the inlet.

Advantageous Effects

According to the present disclosure, a nozzle having a wide area may be opened and closed using the same operating force by arranging the nozzle perpendicularly to a flow path to open and close the nozzle, thereby increasing discharge of condensate.

BEST MODE

An exemplary embodiment of the present disclosure may propose a steam trap including a body including an inlet and an outlet, and formed with a flow path between the inlet and the outlet, an opening/closing unit installed in the outlet of the body and configured to open and close the flow path, and an operating unit installed on the flow path and configured to operate the opening/closing unit, wherein the opening/closing unit is formed with at least one discharge hole and includes a nozzle configured to close a side of the outlet of the flow path, a through hole connected to the discharge hole when the opening/closing unit performs an opening operation, an opening/closing unit configured to close or open the discharge hole while moving in a straight line in close contact with the nozzle, and an operation rod connecting the operation unit and the opening/closing unit and configured to move the opening/closing unit in a straight line.

An exemplary embodiment of the present disclosure proposes a steam trap including a body including an inlet and an outlet, and formed with a flow path between the inlet and the outlet, an opening/closing unit installed in the outlet of the body and configured to open and close the flow path, and an operating unit installed on the flow path and configured to operate the opening/closing unit, wherein the opening/closing unit is formed with a discharge hole and includes a nozzle configured to close a side of the outlet of the flow path, a through hole connected to the discharge hole when the opening/closing unit performs an opening operation, an opening/closing unit configured to close or open the discharge hole while rotating in close contact with the nozzle, an operating rod connecting the operating unit to the opening/closing unit and configured to rotate the opening/closing unit through the operating unit, and a connection link having one end that is rotatably connected to the operating rod and a remaining end coupled to the opening/closing unit and configured to convert linear motion of the operating rod into rotary motion of the opening/closing unit.

MODE FOR INVENTION

Terms or words used in the specification and claims are not limited to common or dictionary meanings, but should be construed as meanings corresponding to technical aspects of the embodiments of the present disclosure based on the principle that "the inventor may appropriately define the terms in order to best describe his invention."

Embodiments described in the specification and components shown in the drawings are merely exemplary embodiments of the present disclosure and do not represent all technical features of the present disclosure, and thus, it is to be appreciated that various equivalents and modifications can be made to substitute the features when the application is filed.

First Embodiment

Figure 1:
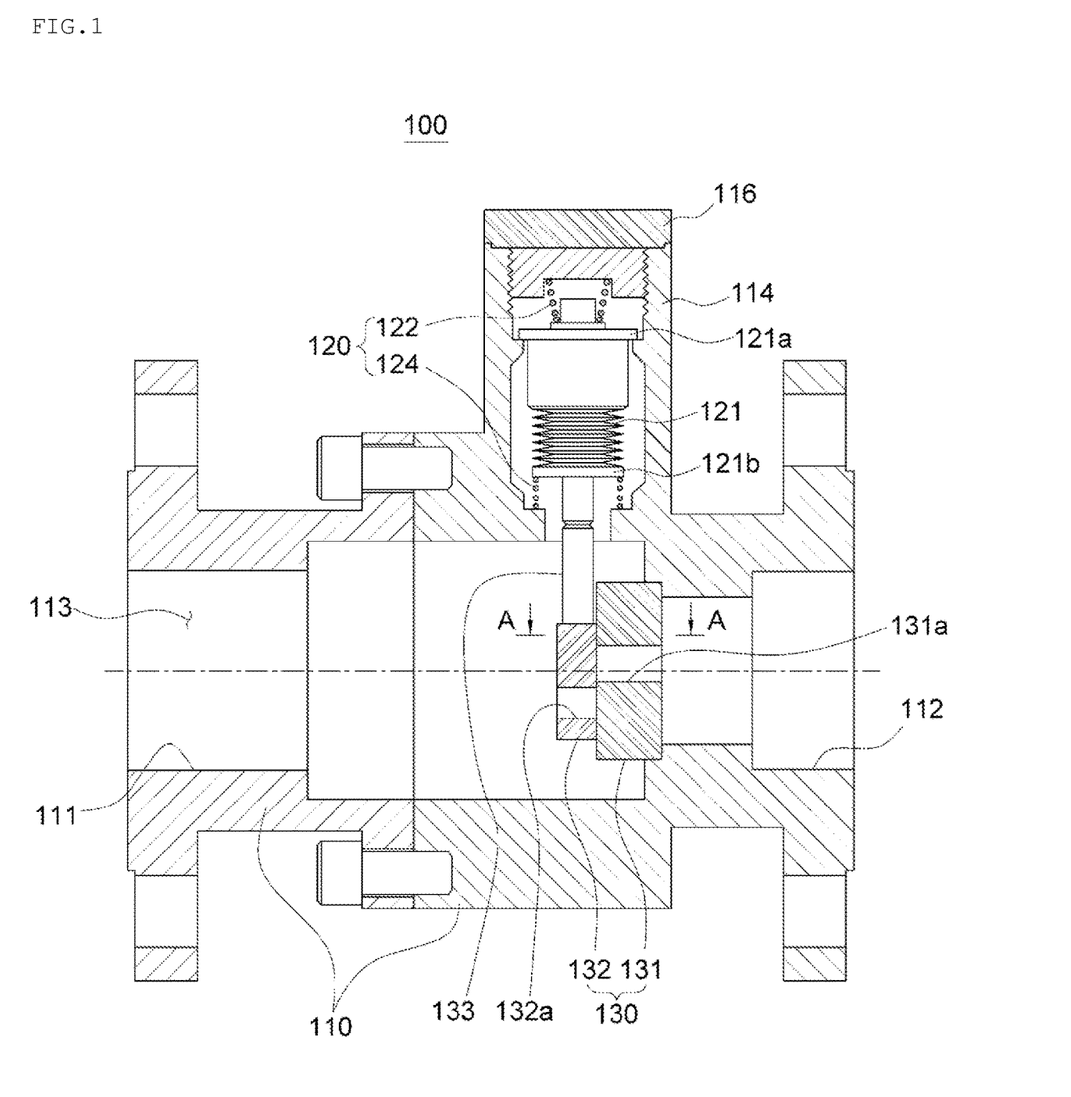
FIG. 1 is a cross-sectional view showing a steam trap according to a first embodiment of the present disclosure.
Figure 2:
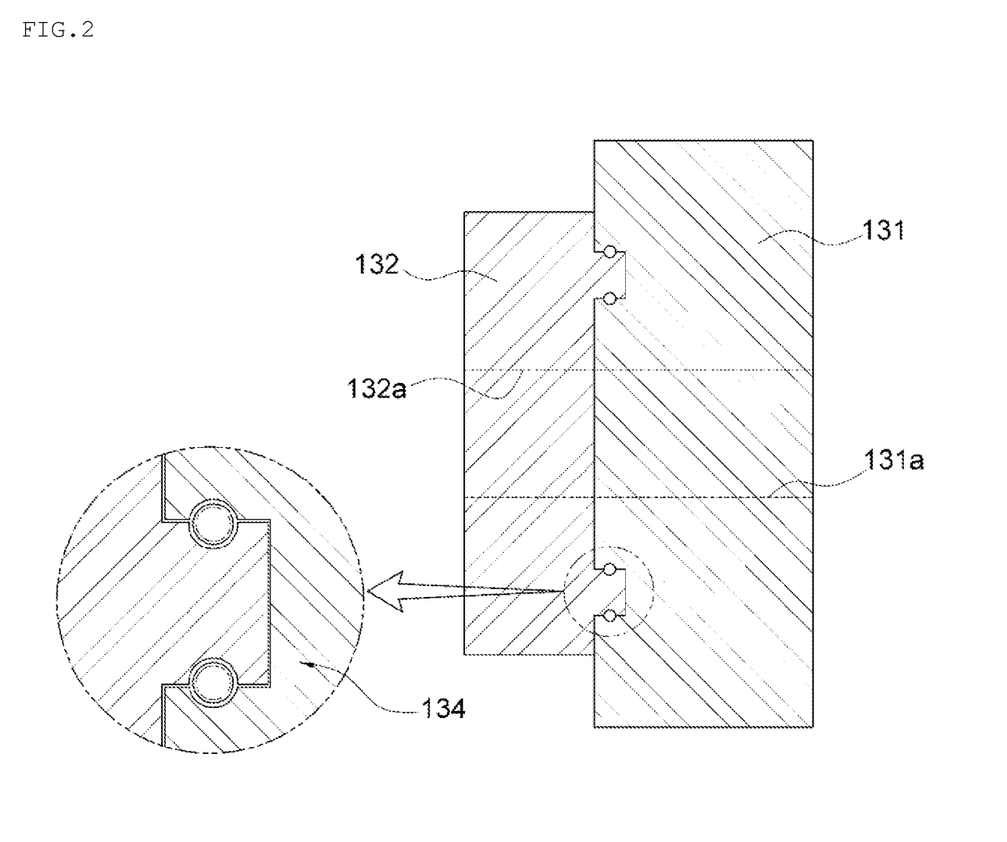
FIG. 2 is a cross-sectional view taken along line A-A of FIG. 1.
Figure 3:
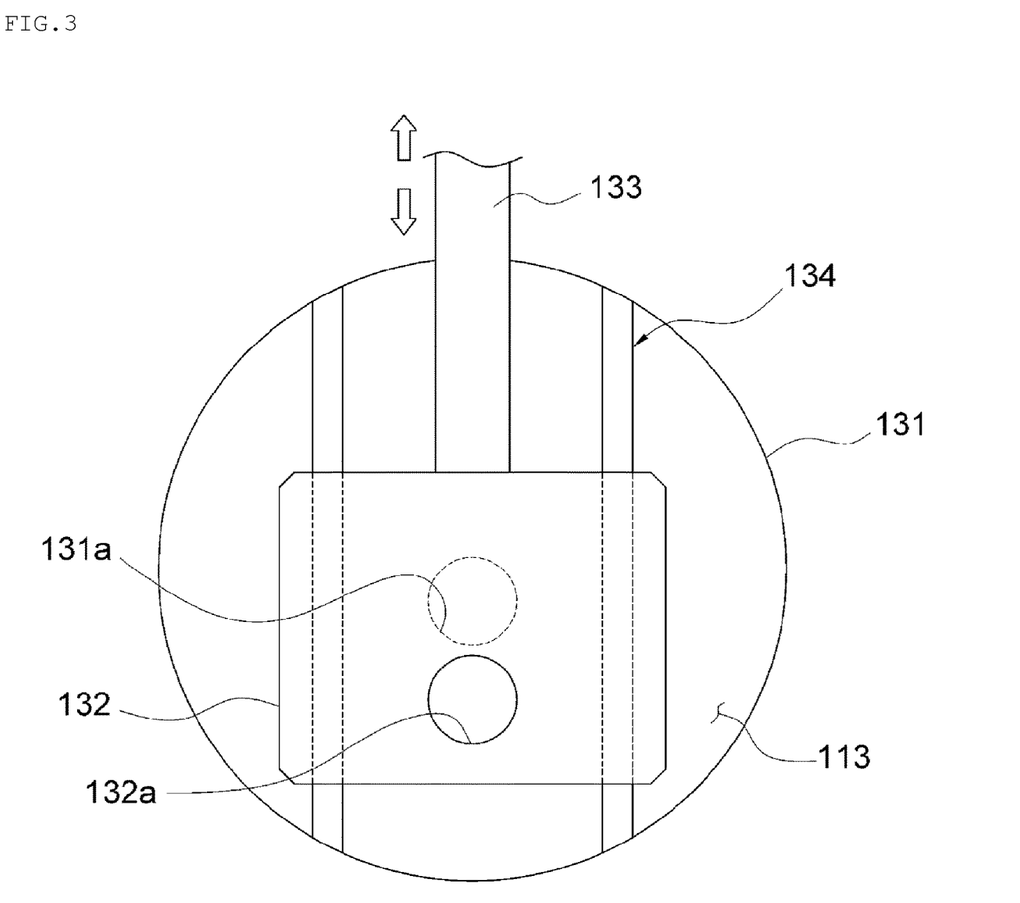
FIG. 3 is a front view showing an opening/closing unit of the steam trap of FIG. 1.

FIG. 1 is a cross-sectional view showing a steam trap according to an embodiment of the present disclosure. FIG. 2 is a cross-sectional view taken along line A-A of FIG. 1. FIG. 3 is a front view showing an opening/closing unit of the steam trap of FIG. 1.

Figure 4:
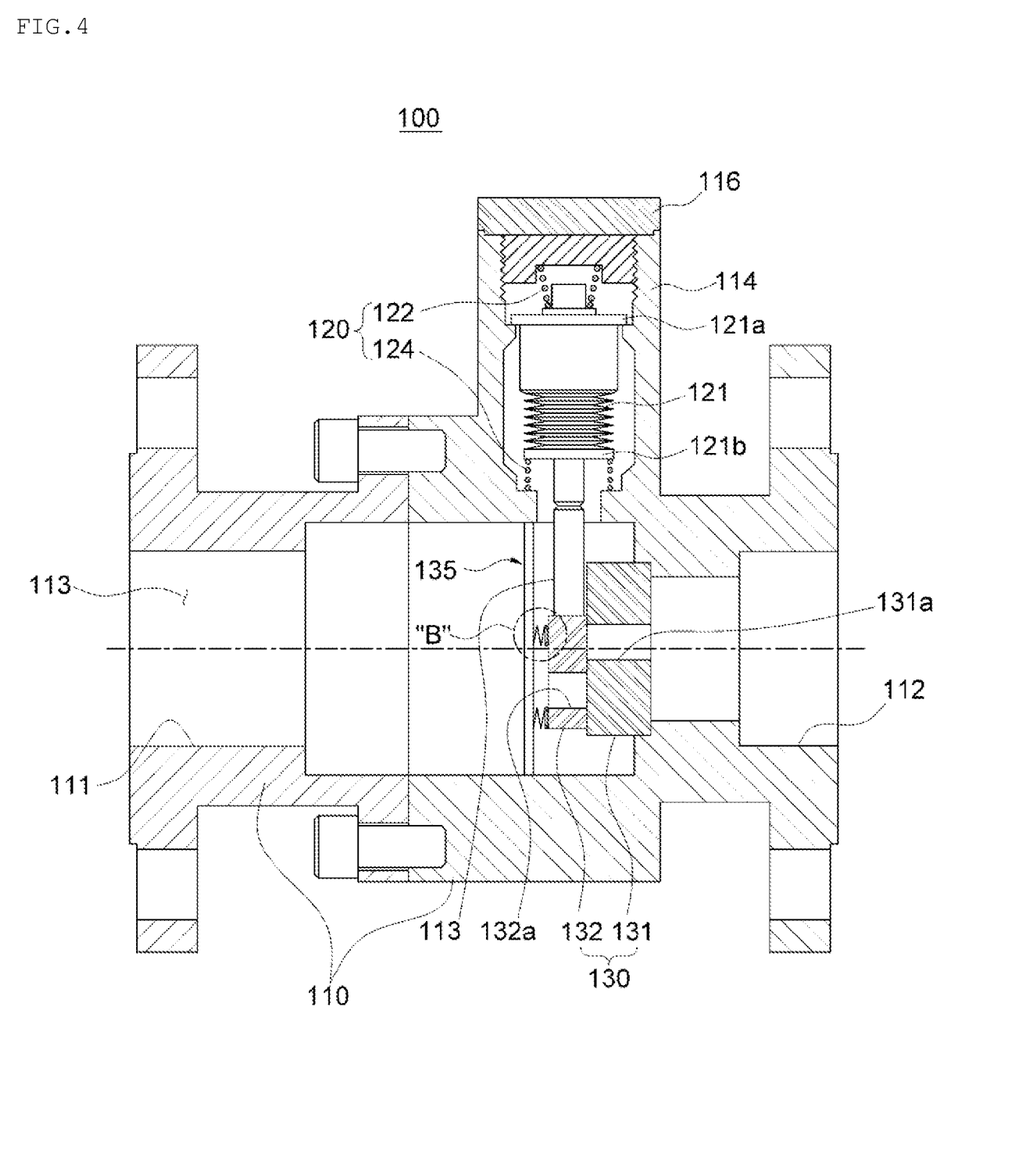
FIG. 4 is a cross-sectional view of another form of the opening/closing unit of the steam trap of FIG. 1.
Figure 5:
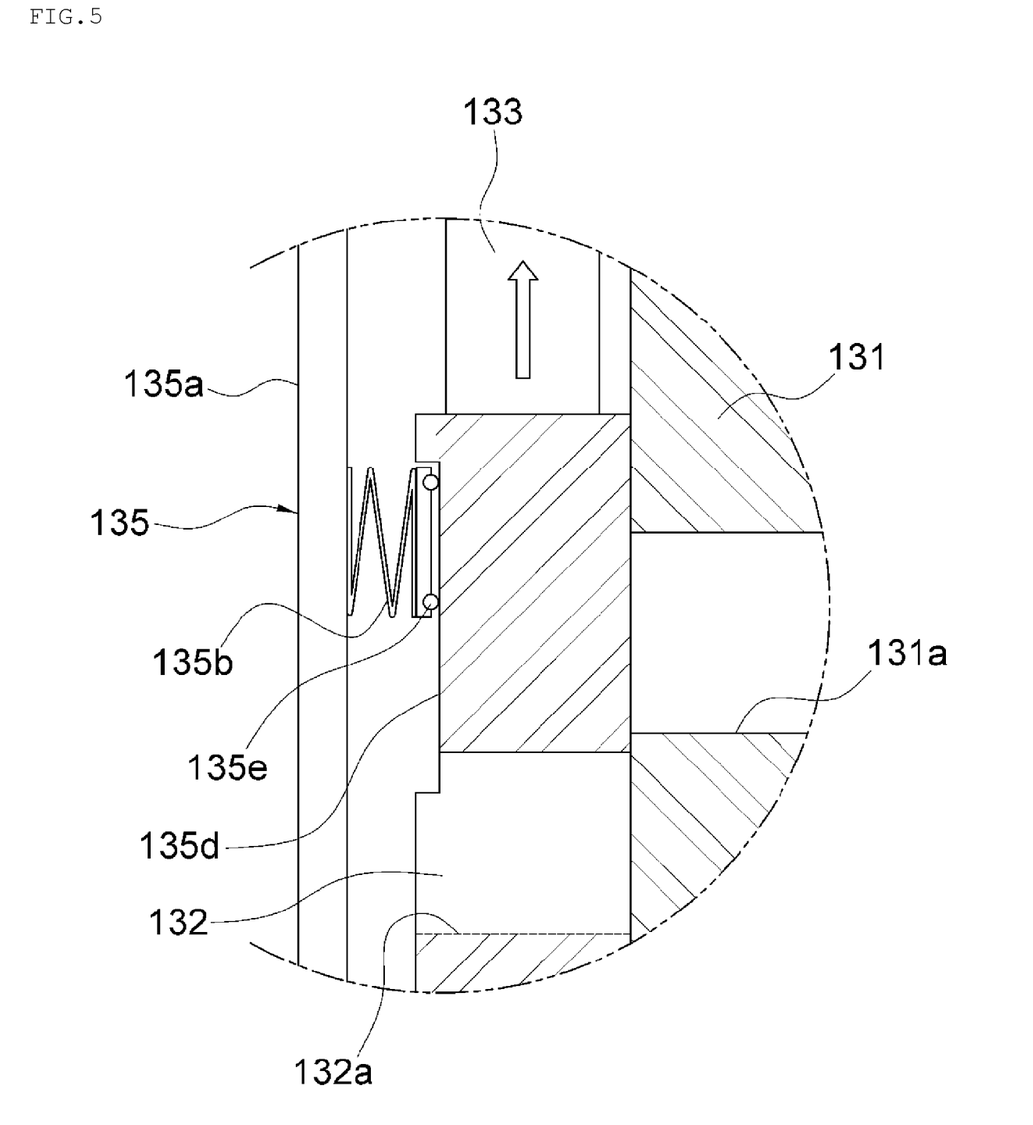
FIG. 5 is a diagram showing portion B of FIG. 4 in detail.
Figure 6:
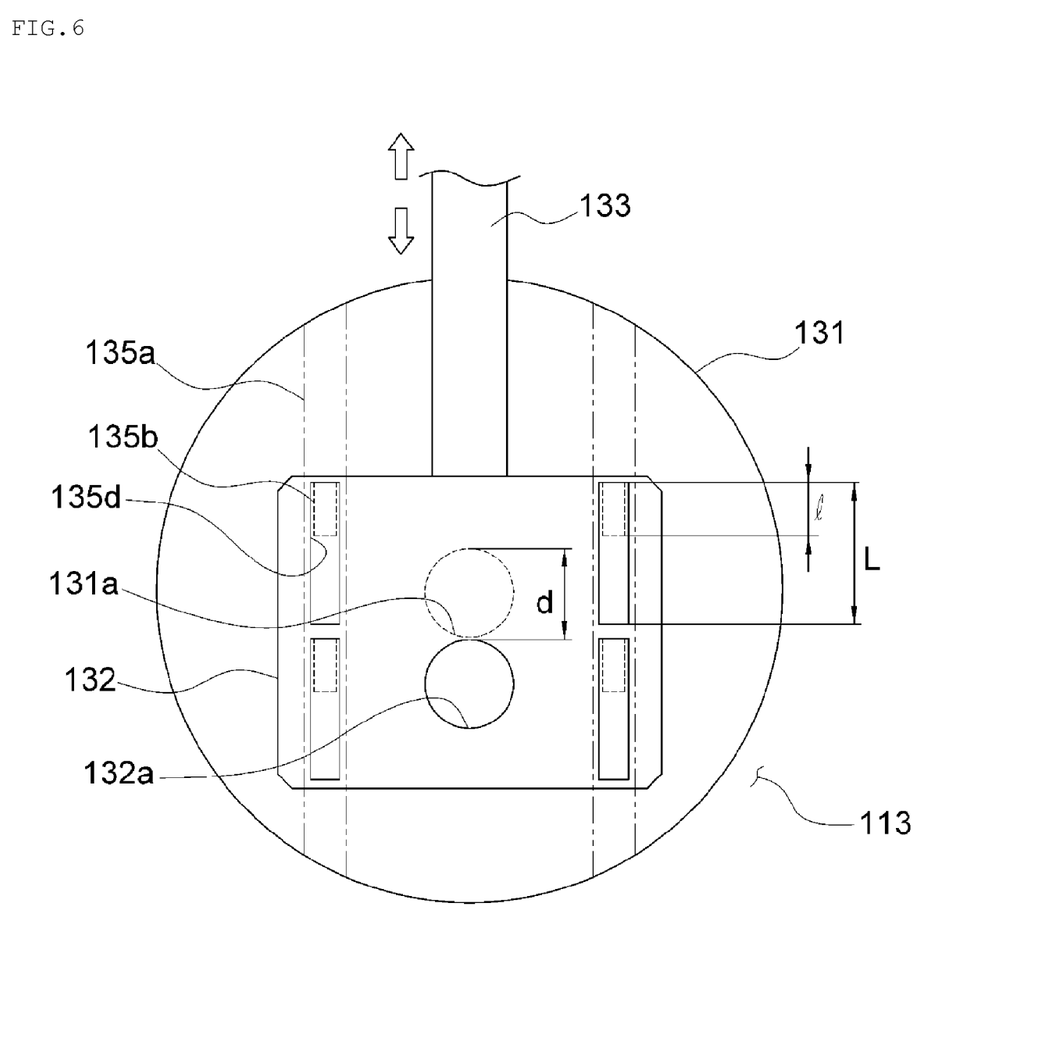
FIG. 6 is a front view showing the opening/closing unit of the steam trap of FIG. 4.

FIG. 4 is a cross-sectional view of another form of the opening/closing unit of the steam trap of FIG. 1. FIG. 5 is a diagram showing B of FIG. 4 in detail. FIG. 6 is a front view showing the opening/closing unit of the steam trap of FIG. 4.

Referring to FIGS. 1 to 6, a steam trap 100 according to an embodiment of the present disclosure may be connected to a steam pipe for transferring steam to collect condensate generated from the steam pipe and to discharge the collected condensate through a condensate discharge pipe, and may include a body 110, an operating unit 120, and an opening/closing unit 130.

The body 110 may be connected between the steam pipe and the condensate discharge pipe and may be formed like a pipe that is perforated at both ends thereof and has a flow path 113 therein. One end of the body 110 may be provided with an inlet 111 to which the steam pipe is connected, and the other end of the body 110 may be provided with an outlet 112 to which a condensate discharge pipe is connected. Flanges may be formed at edges of the inlet 111 and the outlet 112 in order to fix bolts and nuts when the inlet 111 and the outlet 112 are detachably installed in the steam pipe and the condensate discharge pipe, respectively. Here, the flow path 113 may be a space through which steam, condensate, gas, etc. pass.

The outlet 112 may be formed with a smaller diameter than that of the flow path 113. This serves to allow the opening/closing unit 130 to be described later to block or open the outlet 112 through up and down reciprocating motion.

The body 110 may include a pipe-shaped installation part 114 that protrudes perpendicularly to an outer circumferential surface and is connected to the flow path 113. The installation part 114 may form an installation space connected to the flow path 113 to install the operating unit 120 to be described later. The installation part 114 may have an opened upper end and may be opened and closed by a separate cover 116.

The body 110 may include a filter 123 between the inlet 111 and the outlet 112 to filter out foreign substances contained in the condensate. That is, the filter 123 may filter out particulate foreign substances included in steam, condensate, and gas passing through the flow path 113, and may be formed of stainless steel in a cylindrical shape.

The operating unit 120 may be used to open and close the opening/closing unit 130 to be described later and may include a bellows 121.

The bellows 121 may be formed of a stretchable stainless steel material, and may have a continuous zigzag shape, that is, a corrugated pipe shape for smooth expansion or contraction.

Liquid may be accommodated inside the bellows 121. When the bellows 121 are expanded or contracted, the liquid may be heated by condensate, steam, gas, etc. introduced into the flow path 113 through the inlet 111 to expand the bellows 121. That is, the bellows 121 may close the opening/closing unit 130 to be described later by being expanded by latent heat of gas, condensate, steam, etc., and may open the opening/closing unit 130 by being contracted through self-cooling.

An upper flange 121a may be fixed to one side (upper end of FIG. 1) of the bellows 121 and a lower flange 121b may be fixed to the other side (lower end of FIG. 1) of the bellows 121. A spring 122 for elastically supporting the bellows 121 of the operating unit 120 may be installed between the upper flange 121a of the bellows 121 and the cover 116 of the body 110.

The operating unit 120 may further include an elastic member 124 installed between the other side (lower end) of the bellows 121 and a bottom of the installation space. The elastic member 124 may provide elastic force for pressing the bellows 121 upward to rapidly open the opening/closing unit 130 when the bellows 121 are contracted.

The opening/closing unit 130 may be operated by the operating unit 120 to close or open the flow path 113 and may include a nozzle 131, an opening/closing member 132, and an operating rod 133.

The nozzle 131 may be fixed vertically in the flow path 113 to block the outlet 112 of the body 110. The nozzle 131 may be formed with one or more discharge holes 131a for discharging condensate or gas.

The opening/closing member 132 may be connected to the operating rod 133 to be described later and may close or open the discharge holes 131a while reciprocating in the vertical direction in close contact with the nozzle 131. The opening/closing member 132 may include a through hole 132a that is connected to the discharge holes 131a when the bellows 121 are contracted.

That is, the opening/closing member 132 may descend to close the discharge hole 131a when the bellows 121 are expanded, and may rise to open the discharge hole 131a when the bellows 121 are is contracted while the through hole 132a coincides with the discharge hole 131a. Therefore, the through hole 132a and the discharge hole 131a may be formed in the same number and may have the same size, and may be formed at positions corresponding to each other when the bellows 121 are contracted.

The operating rod 133 may connect the bellows 121 and the opening/closing member 132 to reciprocate the opening/closing member 132 upward and downward (vertical direction) during contraction and expansion of the bellows 121. In detail, the operating rod 133 may have an upper end connected to the lower flange 121b of the bellows 121 and a lower end connected to the opening/closing member 132.

The opening/closing unit 130 may further include a slide guide 134 disposed between the nozzle 131 and the opening/closing member 132 to allow the opening/closing member 132 to smoothly reciprocate in the nozzle 131.

The slide guide 134 may include an LM guide installed in a perpendicular vertical direction to the nozzle 131 and the opening/closing member 132. The LM guide is one of mechanical parts, is used to support parts for linear motion, such as a machine tool, and is a linear motion guide device that includes a ball inside a block to facilitate infinite circulation, and recently, the LM guides have been widely used in various mechanical devices and have been easily purchased and used as one produced component from the market, and accordingly, a detailed description of the configuration and operation thereof will be omitted.

The opening/closing unit 130 may further include a pressing unit 135 for pressing the opening/closing member 132 toward the nozzle 131 to minimize a gap between the nozzle 131 and the opening/closing member 132.

The pressing unit 135 may include a support member 135a that is spaced apart from the opening/closing member 132 toward the inlet 111 and is fixed to an inner circumferential surface of the flow path across the flow path 113, a pressing member 135b provided between the opening/closing member 132 and pressing the opening/closing member 132 toward the nozzle 131, and a guide portion for guiding the pressing member 135b to slide on the support member 135a or the opening/closing member 132.

The support member 135a may be configured in one pair, and here, the support members 135a may be spaced apart from each other and may be fixed to the inner circumferential surface of the flow path 113 across the flow path 113 in the vertical direction.

The pressing member 135b may be disposed between the support member 135a and the opening/closing member 132 to press the opening/closing member 132 toward the nozzle 131 with respect to the support member 135a and may include a plate spring that has elasticity and is bent several times in a zigzag manner.

The pressing member 135b may have one end of both side ends, which is fixed to the support member 135a or the opening/closing member 132, and the other end that is slidably coupled to the opening/closing member 132 or the support member 135a.

For example, as shown in FIG. 5, the pressing member 135b may have one-side end fixed to the support member 135a and the other-side end that is guided by the guide portion to be slidably coupled to the opening/closing member 132.

As shown in FIG. 5, the guide portion may be configured as a slide groove 135d formed in the opening/closing member 132, into which the other-side of the pressing member 135b is inserted so as to slide.

A ball member 135e may also be installed between the other-side end of the pressing unit 135 and the slide groove 135d to allow the other-side end of the pressing member 135b to smoothly slide on the slide groove 135d.

Here, the slide groove 135d may be formed in a portion to which one end of both the side ends of the pressing member 135b, which is slidably coupled to the support member 135a or the opening/closing member 132, is coupled, that is, the support member 135a or the opening/closing member 132.

Separate plate members may be fixed to the both side ends of the pressing member 135b, and may then be coupled to the support member 135a and the opening/closing member 132.

A vertical length L of the slide groove 135d may be equal to or greater than the sum of a vertical length 1 of the pressing member 135b and a moving distance d of the opening/closing member 132 during opening and closing operations of the opening/closing unit 130. That is, this is because, when the vertical length L of the slide groove 135d is less than the sum of the vertical length 1 of the pressing member 135b and the moving distance d of the opening/closing member 132, the discharge hole 131a of the nozzle 131 and the through hole 132a of the opening/closing member 132 need to be prevented from completely coinciding with each other to prevent the discharge hole 131a from being completely opened.

Second Embodiment

Figure 7:
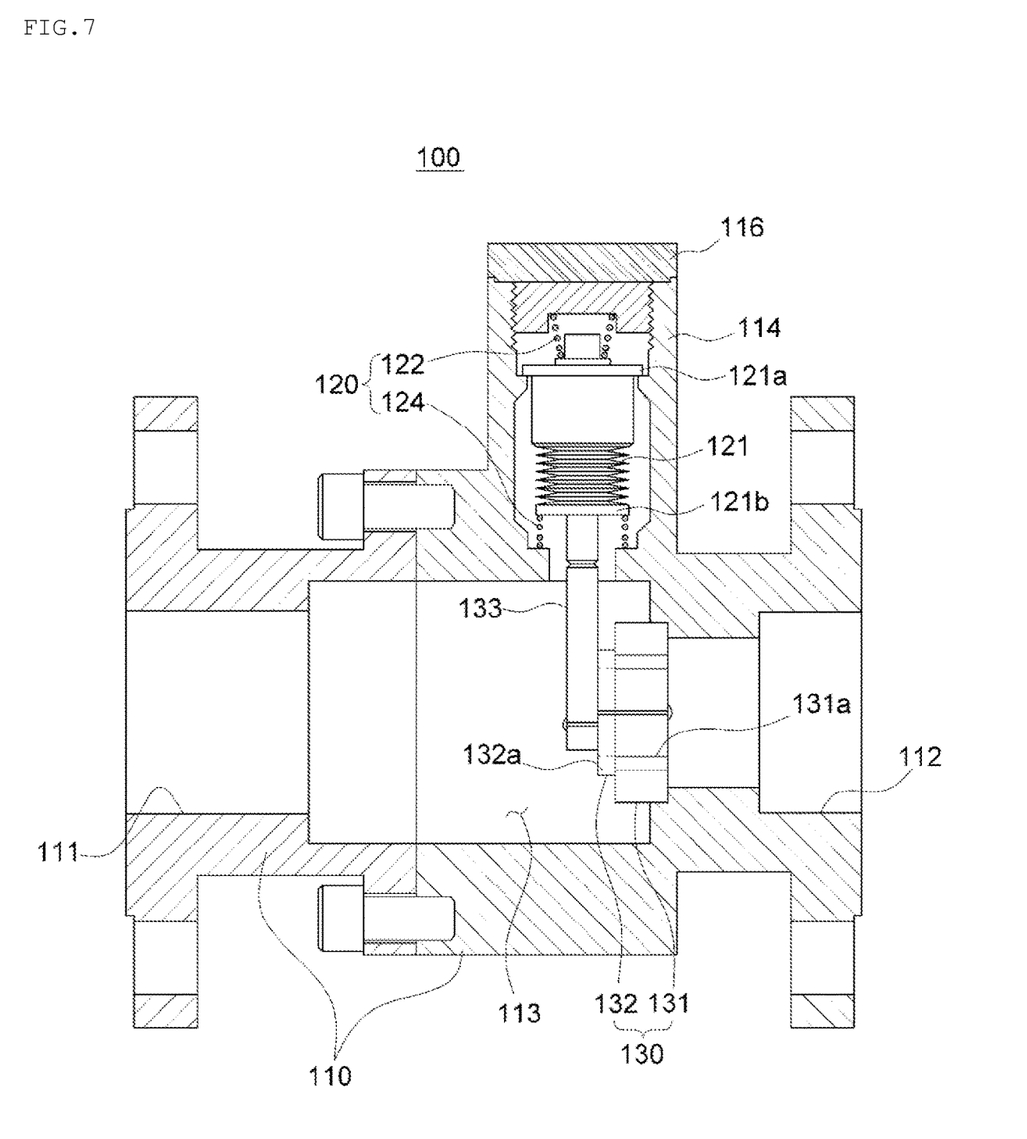
FIG. 7 is a cross-sectional view showing a steam trap according to a second embodiment of the present disclosure.
Figure 8:
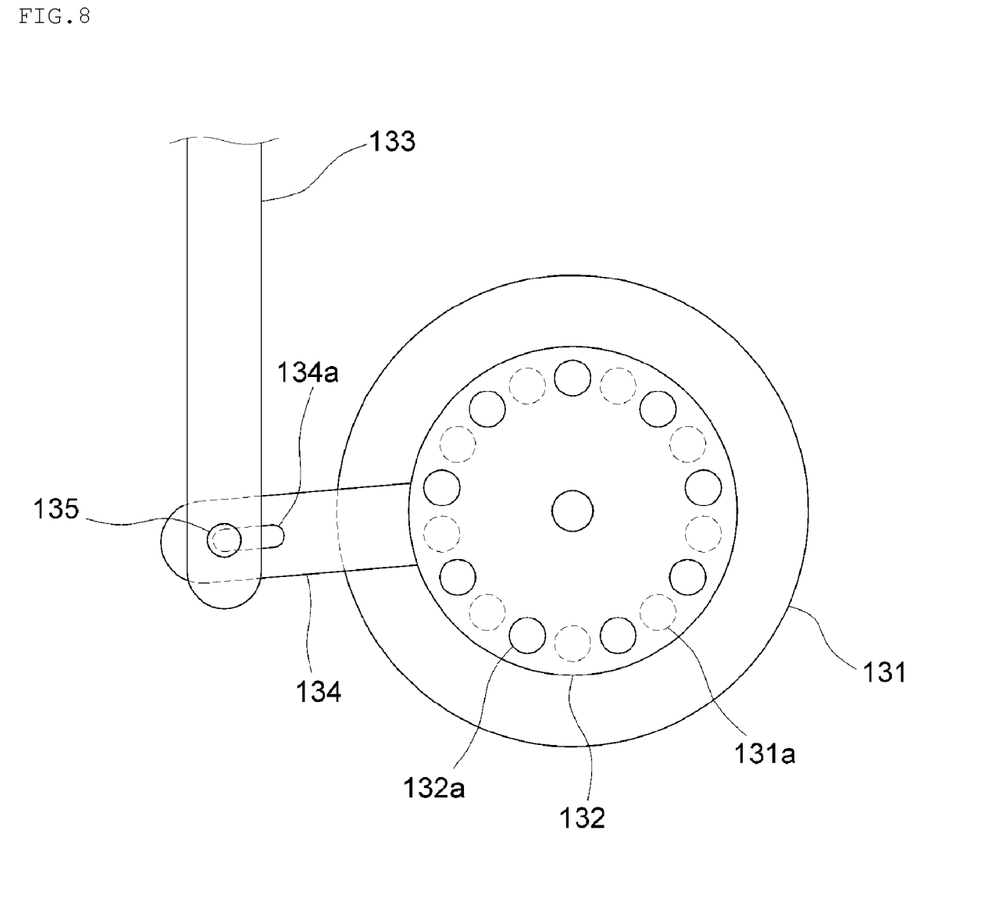
FIG. 8 is a front view showing an opening/closing unit in the steam trap of FIG. 7.
Figure 9:
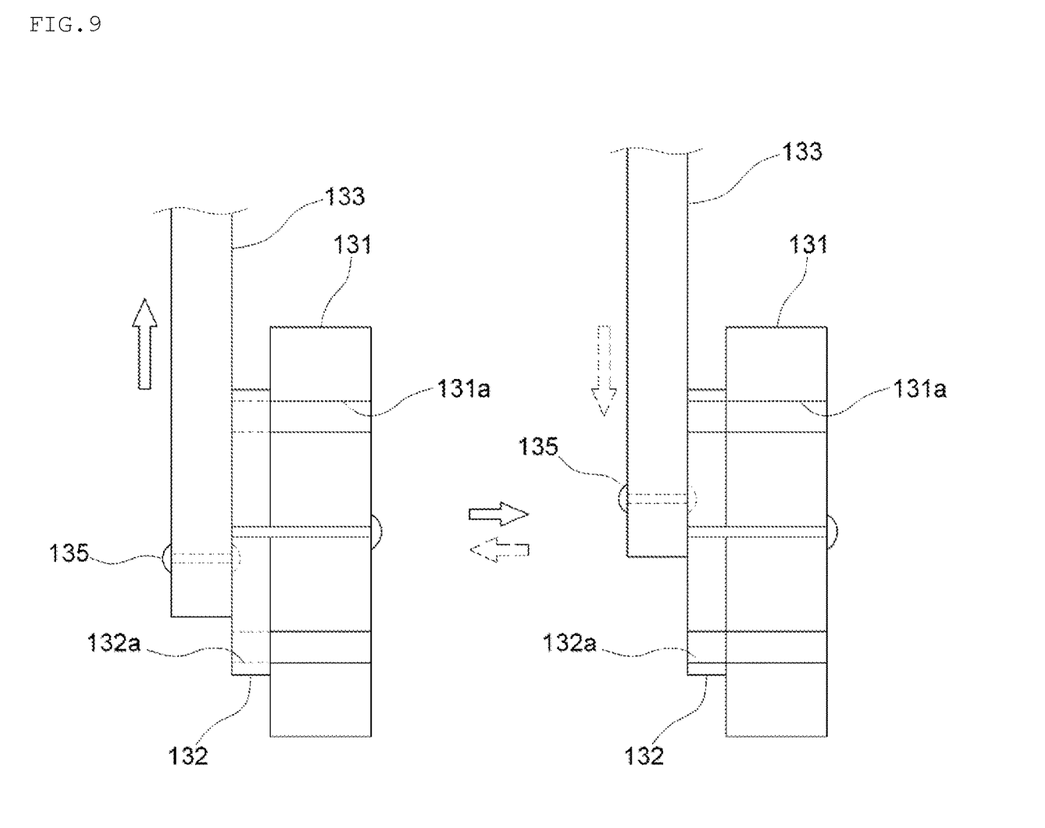
FIG. 9 is a cross-sectional view showing the state before and after an operation of an opening/closing unit in the steam trap of FIG. 7.
Figure 10:
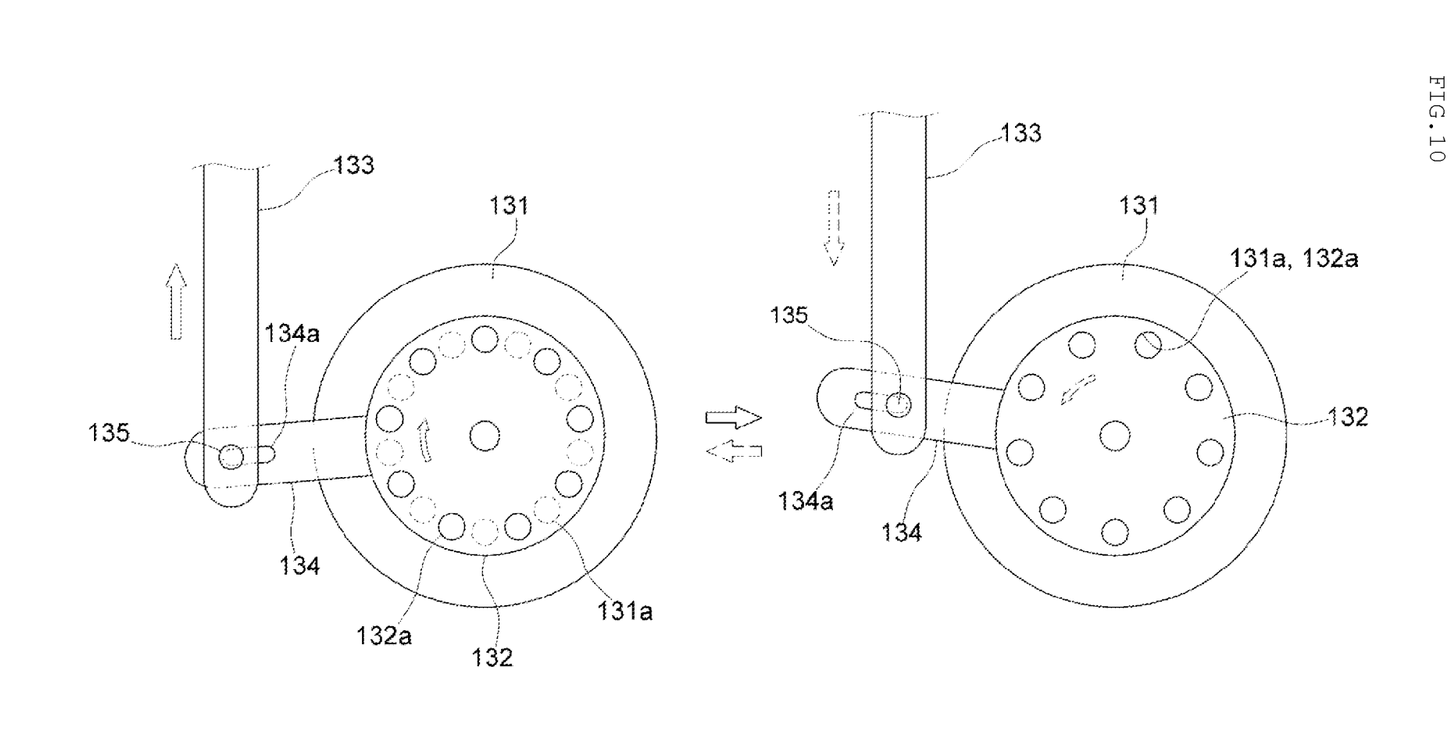
FIG. 10 is a front view showing the state before and after the operation of an opening/closing unit in the steam trap of FIG. 7.

FIG. 7 is a cross-sectional view showing a steam trap according to an embodiment of the present disclosure. FIG. 8 is a front view showing an opening/closing unit in the steam trap of FIG. 7. FIG. 9 is a cross-sectional view showing the state before and after operation of an opening/closing unit in the steam trap of FIG. 7. FIG. 10 is a front view showing the state before and after the operation of an opening/closing unit in the steam trap of FIG. 7.

Referring to FIGS. 7 to 10, a steam trap 200 according to a second embodiment of the present disclosure may be connected to a steam pipe for transferring steam to collect condensate generated from the steam pipe and to discharge the collected condensate through a condensate discharge pipe, and may include a body 210, an operating unit 220, and an opening/closing unit 230.

The body 210 may be connected between the steam pipe and the condensate discharge pipe and may be formed like a pipe that is perforated at both ends and has a flow path 211 therein. One end of the body 210 may be provided with an inlet 211 connected to the steam pipe, and the other end of the body 210 may be provided with an outlet 212 to which a condensate discharge pipe is connected. Flanges may be formed at edges of the inlet 211 and the outlet 212 in order to fix bolts and nuts when the inlet 211 and the outlet 212 are detachably installed in the steam pipe and the condensate discharge pipe, respectively. Here, a flow path 213 may be a space through which steam, condensate, gas, etc. pass.

The outlet 212 may be formed with a smaller diameter than that of the flow path 213. This serves to allow the opening/closing unit 230 to be described later to block or open the outlet 212 through up and down reciprocating motion.

The body 210 may include a pipe-shaped installation part 214 that protrudes perpendicularly to an outer circumferential surface and is connected to the flow path 213. The installation part 214 may form an installation space connected to the flow path 213 to install the operating unit 220 to be described later. The installation part 214 may have an open upper end and may be opened and closed by a separate cover 216.

The body 210 may include a filter 223 between the inlet 211 and the outlet 212 to filter out foreign substances contained in the condensate. That is, the filter 223 may filter out particulate foreign substances included in steam, condensate, and gas passing through the flow path 213, and may be formed of stainless steel in a cylindrical shape.

The operating unit 220 may be used to open and close the opening/closing unit 230 to be described later and may include a bellows 221.

The bellows 221 may be formed of a stretchable stainless steel material, and may have a continuous zigzag shape, that is, a corrugated pipe shape for smooth expansion or contraction.

Liquid may be accommodated inside the bellows 221. When the bellows 221 are expanded or contracted, the liquid may be heated by condensate, steam, gas, etc. introduced into the flow path 213 through the inlet 211 to expand the bellows 221. That is, the bellows 221 may close the opening/closing unit 230 to be described later by being expanded by latent heat of gas, condensate, steam, etc., and may open the opening/closing unit 230 by being contracted through self-cooling.

An upper flange 221a may be fixed to one side (upper end of FIG. 7) of the bellows 221 and a lower flange 221b may be fixed to the other side (lower end of FIG. 7) of the bellows 221. A spring 222 for elastically supporting the bellows 221 of the operating unit 220 may be installed between the upper flange 221a of the bellows 221 and the cover 216 of the body 210.

The filter 223 may filter out particulate foreign substances included in steam, condensate, and gas passing through the flow path 213, and may be formed of stainless steel in a cylindrical shape. The filter 223 may be coupled to an outer circumference of the upper flange 221a and may be installed to be supported on a lower part (bottom) of the installation space.

The operating unit 220 may further include an elastic member 224 installed between the other side (lower end) of the bellows 221 and the bottom of the installation space. The elastic member 224 may provide elastic force for pressing the bellows 221 upward to rapidly open the opening/closing unit 230 when the bellows 221 are contracted.

The opening/closing unit 230 may be operated by the operating unit 220 to close or open the flow path 213 and may include a nozzle 231, an opening/closing member 232, an operation rod 233, and a connection link 234.

The nozzle 231 may be positioned vertically to block the outlet 212 of the body 210 and may be fixed to the inner circumferential surface of the flow path 213 at a side of the outlet 212. The nozzle 231 may be formed with at least one discharge hole 231a for discharging condensate or gas. Here, the discharge hole 231a may be formed in plural depending on the pressure and temperature in the flow path 213.

The opening/closing member 232 may be connected to the operation rod 233 to be described later and may close or open the discharge hole 231a of the nozzle 231 while reciprocating and rotating at a preset angle in close contact with the nozzle 231. The opening/closing member 232 may include one or more through holes 232a that are connected to the discharge hole 231a to open the discharge hole 231a when the bellows 221 are contracted.

The discharge hole 231a of the nozzle 231 and the through hole 232a of the opening/closing member 232 may be configured in plural and may be configured in the same number. When the discharge hole 231a and the through hole 232a are configured in plural, the discharge hole 231a and the through hole 232a may be formed in a circumferential direction and may be spaced apart from each other at a preset angle.

When the opening/closing member 232 reciprocates and rotates at a preset angle, a distance to the discharge hole 231a from the center of the nozzle 231 and a distance to the through hole 232a from a rotation center of the opening/closing member 232 may be the same to close or open the discharge hole 231a.

When the discharge hole 231a and the through hole 232a are formed in plural, a distance between the adjacent discharge holes 231a may be larger than a diameter of the through hole 232a, and a distance between the adjacent through holes 232a may be larger than a diameter of the discharge hole 231a.

The operation rod 233 may connect the lower flange 221b of the operating unit 220 to the opening/closing member 232 and may rotate the opening/closing member 232 during an operation of the operating unit 220.

The connection link 234 may connect the operation rod 233 to the opening/closing member 232 and may convert vertical motion of the operation rod 233 into rotary motion of the opening/closing member 232.

The connection link 234 may have one end that is hinged to a lower end of the operation rod 233 through a hinge pin 235 and the other end fixed to the opening/closing member 232. Here, the connection link 234 may be fixed to the opening/closing member 232 and, when the opening/closing member 232 rotates at a preset angle, the connection link 234 may rotate at the same angle as that of the opening/closing member 232. According to an embodiment of the present disclosure, the connection link 234 may be integrally formed with an outer circumferential surface of the opening/closing member 232 or may be fixed thereto through welding or the like and may be operatively associated with the opening/closing member 232 during rotation of the opening/closing member 232.

A long hole 234a into which the hinge pin 235 is inserted may be formed in an end of the connection link 234, to which a lower end of the operation rod 233 is hinged, and may prevent the operation rod 233 from being deformed when the operation rod 233 reciprocates and rotates vertically.

Here, the through hole 232a may be formed with the same size as that of the discharge hole 231a or with a larger size than the discharge hole 231a to completely open the discharge hole 231a.

The invention claimed is:

1. A steam trap comprising:
  a body including an inlet and an outlet, and formed with a flow path between the inlet and the outlet;
  an opening/closing unit installed in the outlet of the body and configured to open and close the flow path;
  an operating unit installed on the flow path, and configured to operate the opening/closing unit by bellows being expanded or contracted by heat; and
  an pressing unit for pressing the opening/closing member toward a nozzle,
  wherein the opening/closing unit is formed with at least one or more discharge holes and includes the nozzle configured to close a side of the outlet of the flow path outside of the discharge holes, a through hole connected to the discharge hole when the opening/closing unit performs an opening operation, an opening/closing member configured to close or open the discharge hole while moving in a straight line in close contact with the nozzle, and an operation rod connecting bellows of the operation unit and the opening/closing member and transmitting a force of contraction or expansion of the bellows configured to move the opening/closing member in a straight line to the opening/closing member, and
  wherein the pressing unit includes:
  a support member that is spaced apart from the opening/closing member toward the inlet and is arranged across the flow path;
  a pressing member provided between the support member and the opening/closing member and pressing the opening/closing member toward the nozzle; and
  a guide portion for guiding the pressing member to slide on the support member or the opening/closing member.

2. The steam trap of claim 1, further comprising:
  a slide guide disposed between the nozzle and the opening/closing unit and configured to allow the opening/closing unit in close contact with the nozzle to smoothly move in a straight line.

3. The steam trap of claim 1, wherein the pressing member has both side ends coupled with the support member and the opening/closing member and includes a plate spring that is bent several times.

4. The steam trap of claim 1,
  wherein the guide portion is configured as a slide groove formed in the support member or the opening/closing member, into which one side end of the pressing member is inserted so as to slide.

\* \* \* \* \*